W. W. MACFARREN.
VEHICLE WHEEL.
APPLICATION FILED MAR. 9, 1907.
963,304.
Patented July 5, 1910.
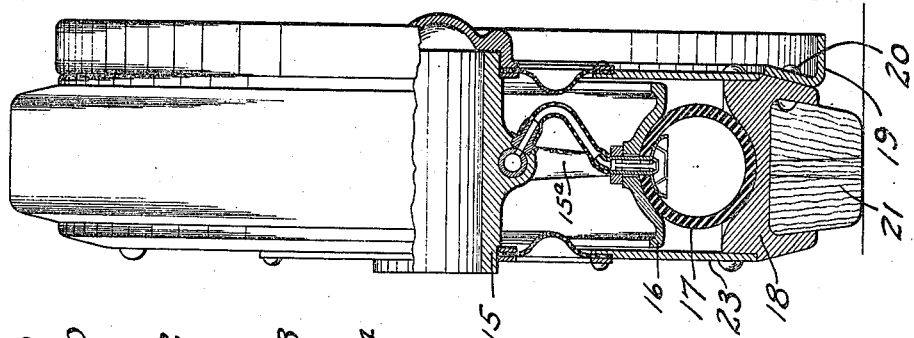
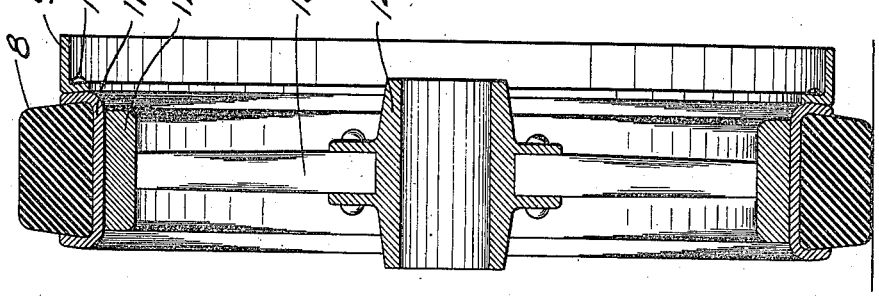
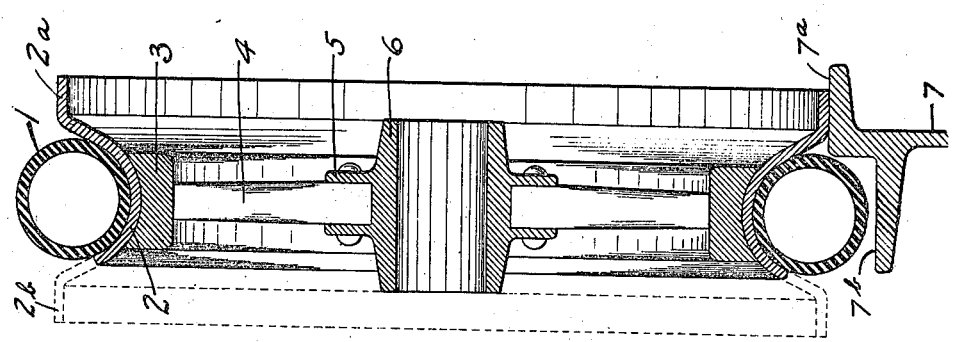
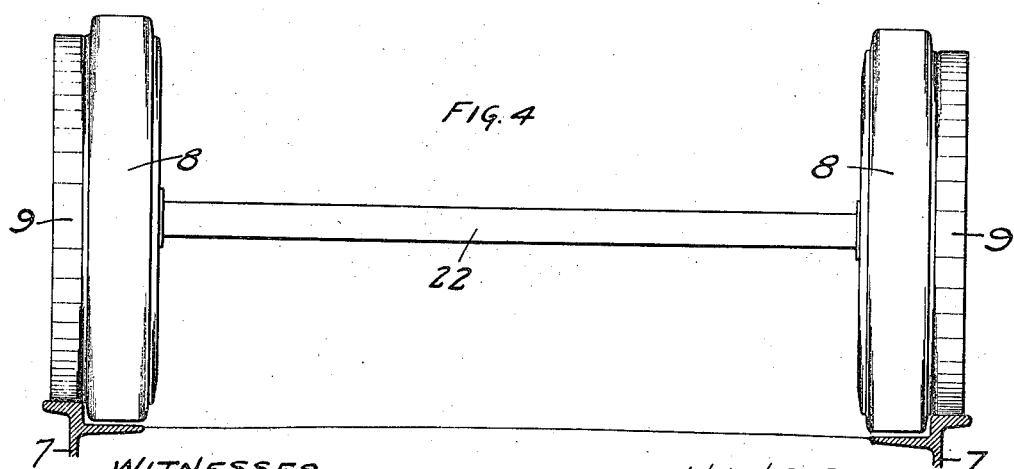
WITNESSES
INVENTOR
Walter W. Macfarren.

UNITED STATES PATENT OFFICE.

WALTER W. MACFARREN, OF PITTSBURG, PENNSYLVANIA, ASSIGNOR TO WM. H. DONNER, OF PITTSBURG, PENNSYLVANIA.

VEHICLE-WHEEL.

963,304.  Specification of Letters Patent.  Patented July 5, 1910.

Application filed March 9, 1907. Serial No. 361,624.

*To all whom it may concern:*

Be it known that I, WALTER W. MACFARREN, a citizen of the United States, residing at Pittsburg, in the county of Allegheny and State of Pennsylvania, have invented certain new and useful Improvements in Vehicle-Wheels, of which the following is a specification.

My invention consists in the combination of a resilient and a nonresilient tire in the same wheel. The resilient tire may be either a pneumatic tire, a solid rubber or cushion tire, or a rigid rim resiliently mounted as shown on my application for vehicle wheel, filed June 27th, Serial No. 323693.

The object of the invention is to provide a smooth rigid tire similar to a wagon tire or car wheel rim, which can be used instead of the resilient tire where the road surface is so formed as to permit, thus saving wear and tear on the resilient tire member.

A further object of the invention is to save cutting and abrasion of the resilient tire in the case of puncture when the same is a pneumatic tire.

A further object of the invention is to provide a smooth rigid tire by the use of which the vehicle can use the ordinary street car tracks in the city streets, thus producing much greater ease of riding and with less power than by any resilient tire, except on very smooth pavements.

It is well known that a street car or other rigid wheeled vehicle will ride smoother on a smooth track than the most costly pneumatic tired vehicle will ride on a roughly paved street.

A further object of my invention is to provide a wheel having a proportionally great width to give greater surface for contact with soft roads and thus obtain greater sustaining power and preventing the wheel from sinking into such soft places and stopping the progress of the vehicle.

To these ends my invention comprises a wheel fitted with a resilient ground bearing tire, and a supplementary rigid tire fastened to the outside of the wheel rim, and adapted to ride on the "head" of an ordinary street "girder rail", the resilient tire clearing the "wagon tread" of the rail by a small amount, so that the weight of the vehicle is entirely carried on the rigid tires; the resilient tires being out of use for the period that the vehicle remains on the track. At the same time the resilient tires come into action immediately as soon as the vehicle leaves the car track, the rigid tires being clear of the ground so as not to interfere with the action of the resilient tires. This construction is of great advantage in cities where such car tracks are available, as heavy wagons and particularly automobile trucks can run to their highest speed with the least expenditure of power and the least wear and tear due to vibration and shocks from the road. The application of my invention is also particularly suitable to automobile busses for carrying passengers, as by it the same ease of riding is obtained as in street cars and the vehicles can make high speed where the condition of the paving outside the tracks may be such as to prohibit this.

Referring to the drawing; Figure 1 is a sectional elevation of a vehicle wheel having a pneumatic tire of the ordinary kind, and a supplementary tire according to my invention. Fig. 2 is a sectional elevation of a vehicle wheel having a solid rubber or cushion tire and a detachable rigid supplementary tire on one side thereof. Fig. 3 is an elevation partly in section of an armored sectional pneumatic vehicle wheel, according to a previous invention of mine before referred to, the same being fitted with a detachable supplementary tire on one side thereof. Fig. 4 is an elevation of a pair of wheels mounted on an axle, each wheel being fitted with a detachable supplementary tire on one side of the wheel.

In Fig. 4 the wheels are shown riding on a pair of "street car" rails of ordinary construction, being the form known as "girder" rails. Fig. 4 clearly shows the supplementary tires 9—9 riding on the heads of the girder rails 7—7, while the resilient tires 8—8 clear the wagon treads of the rails.

In Fig. 1, the pneumatic tire 1 is mounted on curved rim 2, the same having a flange 2ª projecting from one side thereof to form a supplementary tire. In this case the supplementary tire member is integral with the rim and not detachable. It is obvious that a second flange 2ᵇ can be formed on the other side of the rim 2, as shown in dotted lines. The curved rim 2 is mounted on the felly 3, and between said felly and the hub 6 are the spokes 4 secured to the hub by flanges 5, the whole forming the well known type of artillery wheel. The supplementary tire 2ª is shown riding on the head 7ª of a common "girder rail" 7 while the pneumatic tire 1 clears the wagon tread 7ᵇ of the rail 7 by a small amount. Thus all the weight on the wheel is carried by the supplementary tire 2ª directly to the rail 7 without any part of the same being supported by the pneumatic tire 1. It is obvious that should the wheel be run off the rail the pneumatic tire would then support the weight, and it is further obvious that in case the pneumatic tire became punctured or otherwise deflated that the weight on the wheel would be carried by the supplementary tire.

In Fig. 2 the solid rubber tire 8 is mounted on the rim 11 and secured to rim 11 by the rivets 10 is the detachable supplementary tire 9, the same being of the general shape of an angle iron bent to form a circle. The rim 11 is mounted on the felly 12, the same being connected to the hub 14 by the spokes 13. It is obvious that the supplementary tire 9 could be formed as a part of the rim 11, and it is also obvious that a second supplementary tire could be placed on the opposite side of the wheel.

In Fig. 3 I have shown a wheel having a rigid outer rim and tire, the same being resiliently mounted on its hub. The hub 15 is connected by spokes 15ª with an inner rim 16, the same having pockets formed in its circumference for the reception of hollow rubber balls 17 which are clamped therein. An outer rim 18 surrounds these balls having corresponding pockets in its inner circumference. To the outer rim 18 are secured the side plates 23, and also a non-resilient tire 21, made preferably of wood. The supplementary tire 19 is also secured to rim 18 by the rivets 20.

The wheel shown in Fig. 3 acts in the same manner as those shown in Figs. 1 and 2, the supplementary tire carrying the weight when on the rail and the resiliently mounted tire carrying the same when in contact with the ground.

I claim:

1. A vehicle wheel for road use, having a rim, a solid rubber tire mounted thereon extending to the edge of the rim, and a metallic tire with a cylindrical outer surface mounted on said rim outside of the said rubber tire, the diameter of the said metallic tire being substantially less than the diameter of said rubber tire.

2. A vehicle wheel for road use, having a resilient tire larger in diameter than any other part of the wheel extending to the edge of the rim, and a metallic tire having a cylindrical outer surface mounted on the outside of the wheel and adjacent to said resilient tire.

3. A vehicle wheel for road use, having a hub, an outer road bearing surface of a diameter larger than any other part of the wheel surrounding said hub, means for obtaining a resilient action between said road bearing surface and said hub, and a non-resilient tire with a cylindrical outer surface mounted at one side of said outer road bearing surface.

4. The combination of an axle, a pair of wheels mounted thereon, solid rubber tires mounted on the exterior of said wheels, and an annular metallic flange of a less diameter than said rubber tires, mounted on the outside of each wheel, the rubber tires being adapted to resiliently carry the weight of said axle when the same is running on a common road or pavement, and the said metallic flanges being so constructed as to gage with a street car track and run thereon, carrying the said rubber tires out of contact with the ground or track.

5. The combination of an axle, a pair of wheels mounted thereon, metallic rail bearing tires on the outside of each wheel of proper gage to run on a street car track, and solid rubber tires on said wheels, inside of said metallic tires, and adapted to come into ground bearing action when said metallic tires are disengaged from said track.

6. A vehicle wheel, having a central solid rubber tire of one diameter for normal use, and a pair of annular metallic flanges of a less diameter for occasional use, mounted one on each side of the rubber tire, whereby the effective width of the wheel is increased on a soft road.

7. The combination of an axle, a pair of wheels mounted thereon, resilient tires on said wheels for normal use, and a pair of rigid supplementary tires of less diameter on each wheel, for occasional use, one of said supplementary tires being on each side of said resilient tires.

WALTER W. MACFARREN.

Witnesses:
O. J. TOPE,
J. B. CESSNA.